United States Patent [19]
Belcher et al.

[11] Patent Number: 5,669,403
[45] Date of Patent: Sep. 23, 1997

[54] HUNTING BLIND ADAPTED TO BE MOUNTED IN A TREE

[76] Inventors: Michael M. Belcher, 25238 Perch Lake Rd.; Patrick M. Saumier, 619 Lansing St., both of Watertown, N.Y. 13601

[21] Appl. No.: 631,419

[22] Filed: Apr. 12, 1996

[51] Int. Cl.⁶ .................................................. A01M 31/00
[52] U.S. Cl. ..................... 135/90; 135/120.1; 135/901; 135/900; 43/1; 182/187
[58] Field of Search ..................... 135/90, 127, 120.4, 135/901, 900, 117, 115, 95; 43/1; 182/142, 187

[56] References Cited

U.S. PATENT DOCUMENTS

| | | |
|---|---|---|
| 1,654,422 | 12/1927 | Laggren. |
| 2,928,404 | 3/1960 | Klages. |
| 3,008,477 | 11/1961 | Bester. |
| 3,116,808 | 1/1964 | Riley. |
| 3,333,373 | 8/1967 | Taylor et al.. |
| 3,375,831 | 4/1968 | Serbus. |
| 3,590,864 | 7/1971 | Vechesloff. |
| 3,598,133 | 8/1971 | Abert. |
| 3,625,235 | 12/1971 | Gorgichuk. |
| 3,690,334 | 9/1972 | Miller ............................ 135/1 |
| 3,799,608 | 3/1974 | Smutny. |
| 4,224,754 | 9/1980 | Derryberry .................. 135/901 X |
| 4,347,913 | 9/1982 | Gary ............................. 182/142 |
| 4,474,263 | 10/1984 | Christopher ................. 182/142 X |
| 4,505,286 | 3/1985 | Madion. |
| 4,579,198 | 4/1986 | Lee .............................. 182/115 |
| 4,593,789 | 6/1986 | Treants ......................... 182/142 |
| 4,632,138 | 12/1986 | Irwin. |
| 4,798,019 | 1/1989 | Sury .................................. 43/1 |
| 4,813,441 | 3/1989 | Kepley ....................... 135/901 X |
| 4,825,578 | 5/1989 | Robinson .................... 135/901 X |
| 4,827,958 | 5/1989 | Cantwell et al. .............. 135/127 |
| 4,840,252 | 6/1989 | Hucks, Jr. ..................... 182/187 |
| 4,951,696 | 8/1990 | Jones, Sr.. |
| 5,062,234 | 11/1991 | Green. |
| 5,377,711 | 1/1995 | Mueller. |
| 5,388,664 | 2/1995 | Bator ............................ 182/100 |

*Primary Examiner*—Wynn E. Wood
*Attorney, Agent, or Firm*—George R. McGuire

[57] ABSTRACT

A hunting blind adapted to be mounted at an elevated position to a tree. The hunting blind is generally comprised of a framework defining a top, bottom, and continuous side of the blind, a ratchet assembly for securely supporting the blind with respect to the tree, and a pulley assembly for adjusting the elevation of the blind. The framework includes first and second sets of tubular members adapted to be mounted in first and second horizontal planes, respectively, and adapted to be held in spaced vertical relation by a plurality of rods adapted to be operatively connected to, and laterally spaced in vertically extending relation with respect to, the first and second series of tubular members. A plurality of fabric sheets are tautly stretched between and slidably attached to the first and second sets of horizontally extending members to enclose the side of the blind. The fabric panels are composed of a material having the physical characteristic of being able to see through only one side thereof. The pulley assembly includes two ropes, each of which may be manipulated to raise or lower the respective side of the blind to which it is attached.

20 Claims, 5 Drawing Sheets

FIG. 3
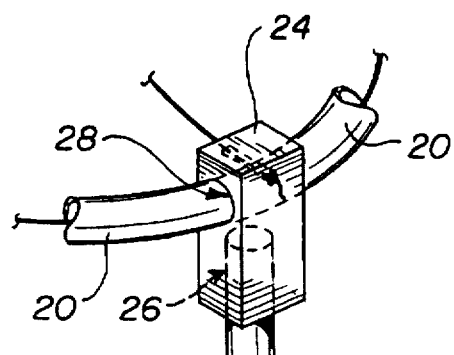
FIG. 4
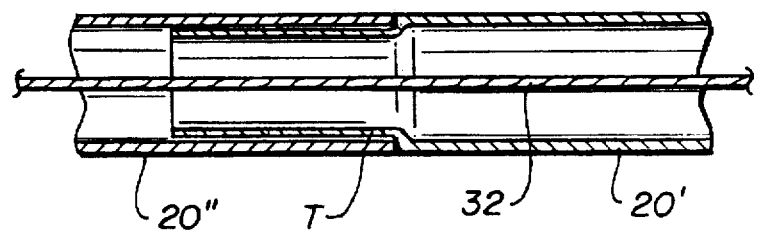
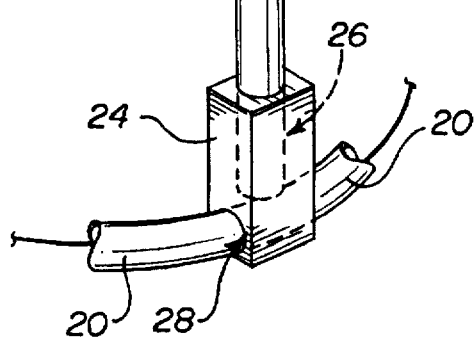
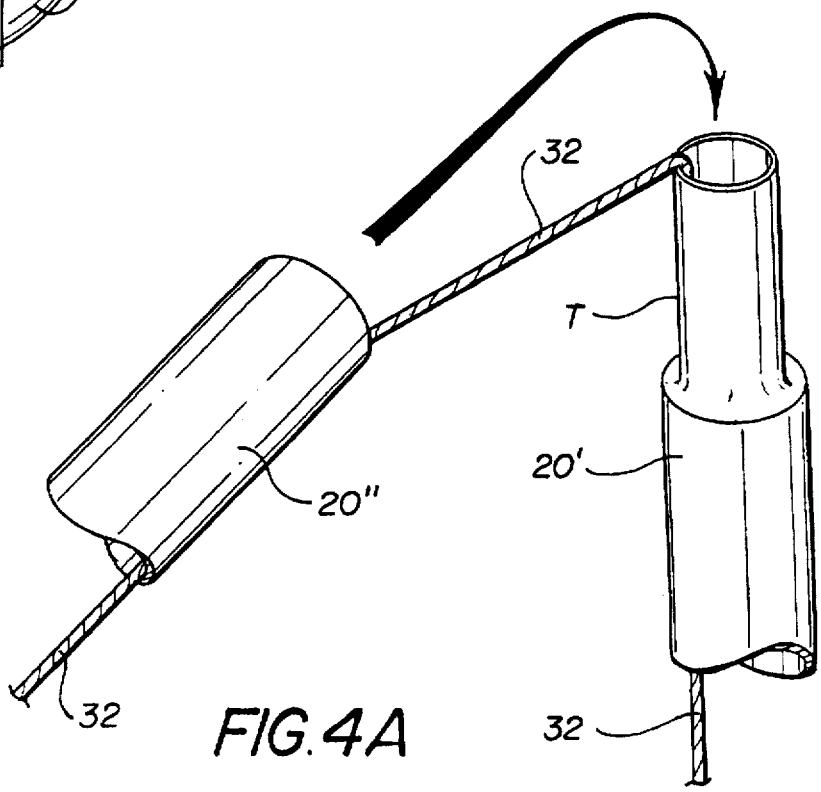
FIG. 4A

HUNTING BLIND ADAPTED TO BE MOUNTED IN A TREE

BACKGROUND OF THE INVENTION

The present invention relates generally to blinds used while hunting, bird watching, or performing some other related outdoor activity, and more particularly to blinds for mounting in a tree or other vertically object, and in conjunction with a conventional tree stand.

When hunting or observing certain wildlife, the hunter or observer (outdoorsman) must remain completely motionless for long periods of time in order not to scare away the animals. In addition, the outdoorsman must be camouflaged to prevent any animals from seeing them, and thus alert the animals of potential danger. These necessary conditions for successfully performing the activity are uncomfortable, especially during inclement weather, and often result in severe cramping.

Therefore, many outdoorsmen will set up hunting blinds on the ground. The blinds obscure the presence of the outdoorsmen by keeping them hidden from view, particularly if the blind is camouflaged, as in the blind disclosed in U.S. Pat. No. 5,377,711 to Mueller which issued Jan. 3, 1995. The blinds permit outdoorsmen some freedom of movement, and also protect them from inclement weather, thereby alleviating some of the problems associated with traditional hunting or wildlife observing.

Quite often, however, it is preferable for an outdoorsman to have a birds-eye view. Therefore, many outdoorsmen will position themselves in a tree or other suitable object. Generally, outdoorsmen will have a tree stand to mount in the tree to give themself a place to sit or stand. However, when positioned in a tree, outdoorsmen again encounter the same problems associated with traditional ground hunting, i.e., remaining motionless and camouflaged. Thus, the same uncomfortable, crampy feelings experienced by a traditional ground outdoorsman are experienced by the outdoorsman in the tree.

Therefore, it would be convenient for outdoorsmen to have a blind that could be mounted in a tree. U.S. Pat. No. 3,116,808 to Riley on Jan. 7, 1964, and U.S. Pat. No. 4,951,696 to Jones, Sr. on Aug. 8, 1990 disclose such devices.

It is a principal object of the present invention to provide a novel and improved hunting blind which may be mounted in a tree.

It is another object of the present invention to provide a hunting blind that is safe to use.

It is a further object of the present invention to provide a hunting blind that is simple and fast to set up and knock down.

It is yet another object of the present invention to provide a hunting blind that provides its user with maximum camouflage.

It is still a further object of the present invention to provide a hunting blind that provides its user with quick and easy access to the outdoors.

It is yet an additional object of the present invention to provide a hunting blind that is inexpensive and easy to manufacture.

It is yet a further object of the present invention to provide a lightweight, easily transportable hunting blind.

Other objects and advantages of the present invention will in part be obvious and in part appear hereinafter.

SUMMARY OF THE INVENTION

In accordance with the foregoing objects and advantages, the present invention provides a hunting blind which may be mounted to a tree trunk at a predetermined height above the ground. Therefore, the blind may be used in combination with a tree stand, thereby providing a hunter with the view associated with using a tree stand, and the camouflage associated with using a hunting blind.

The present hunting blind is generally comprised of a plurality of fabric sheets stretched between first and second series of aluminum, shock corded tubing, each series of tubing extending in its own horizontal plane, and a plurality of laterally spaced, vertically oriented support rods which extend between the first and second series of shock corded tubing. The hunting blind further includes ratchet means for mounting the blind to a tree trunk, and a pulley assembly operatively connected to the blind for hoisting and leveling it with respect to the tree.

The shock corded tubing and vertical support rods are interconnected to one another by tee mounting blocks. The tee blocks have one hole formed axially therethrough for passage of the shock corded tubing, and a bored hole formed in another surface thereof, perpendicular to the through hole. The bored hole receives the vertical support rod, and the completed network of shock corded tubing and support rods forms an essentially cylindrical framework.

The fabric sheets include closed loop upper and lower ends. Before passing the shock corded tubing through the tee blocks, the tubing can be passed through the looped ends of the fabric panels. Once the fabric panels are attached to the shock corded tubing, the tubing may be passed through the tee blocks, thereby stretching the fabric panels between the first and second series of shock corded tubing.

Because the fabric panels are attached to the completed framework by their looped ends, and not fixedly secured to the framework, they are slidable along the shock corded tubing. Therefore, a hunter positioned within the blind can slide a sheet away from the adjacent sheet in order to point a weapon (i.e., a gun barrel or an arrow) out of the blind. Furthermore, the fabric panels are composed of a material having physical characteristics which permit light to pass through only one side thereof. Therefore, the panels should be mounted such that the hunter can see out, but light from outside the blind cannot pass into the blind.

To mount the blind to a tree, the user would take a rope and insert it through a mounting block positioned in abutting relation to one side of the tree, pass the rope around the tree, and insert the rope through another mounting block positioned in abutting relation to the opposite side of the tree. One of the rope's free ends may then be tied to an S-hook, and the other end passed through a one-way ratchet. The ratchet is also attached to the S-hook, thereby interconnecting to the rope's free ends. The end of the rope passed through the ratchet may then be pulled until the blind is securely mounted to the tree.

A pulley system is also incorporated into the hunting blind. A double sheath pulley includes two ropes passing thereover which run from respective mounting blocks positioned on the side of the blind opposite the tree, and then pass over the pulley and are tied off on a mounting block which is positioned adjacent the tree. The two respective mounting blocks to which one end of each rope is attached, are on opposing sides of and are equidistant from the pulley. Therefore, equal amounts of force can be applied to each rope to obtain the same results, i.e., a given amount of force will raise or lower each side of the blind an equal amount.

The hunting blind can be raised, lowered, or leveled by a user manipulating the ropes.

BRIEF DESCRIPTION OF THE DRAWINGS

The foregoing and other features of the invention will be more readily understood and fully appreciated from the following Detailed Description, taken in conjunction with the accompanying drawings, wherein:

FIG. 3 is a partial perspective view showing vertical and horizontal support members taken along view line 3—3 of FIG. 2;

FIG. 4 is a cross-sectional view of a horizontal, shock cord support member taken along section line 4—4 of FIG. 2;

FIG. 4A is an exploded perspective view of the shock cord member of FIG. 4;

DETAILED DESCRIPTION

Figure 1:
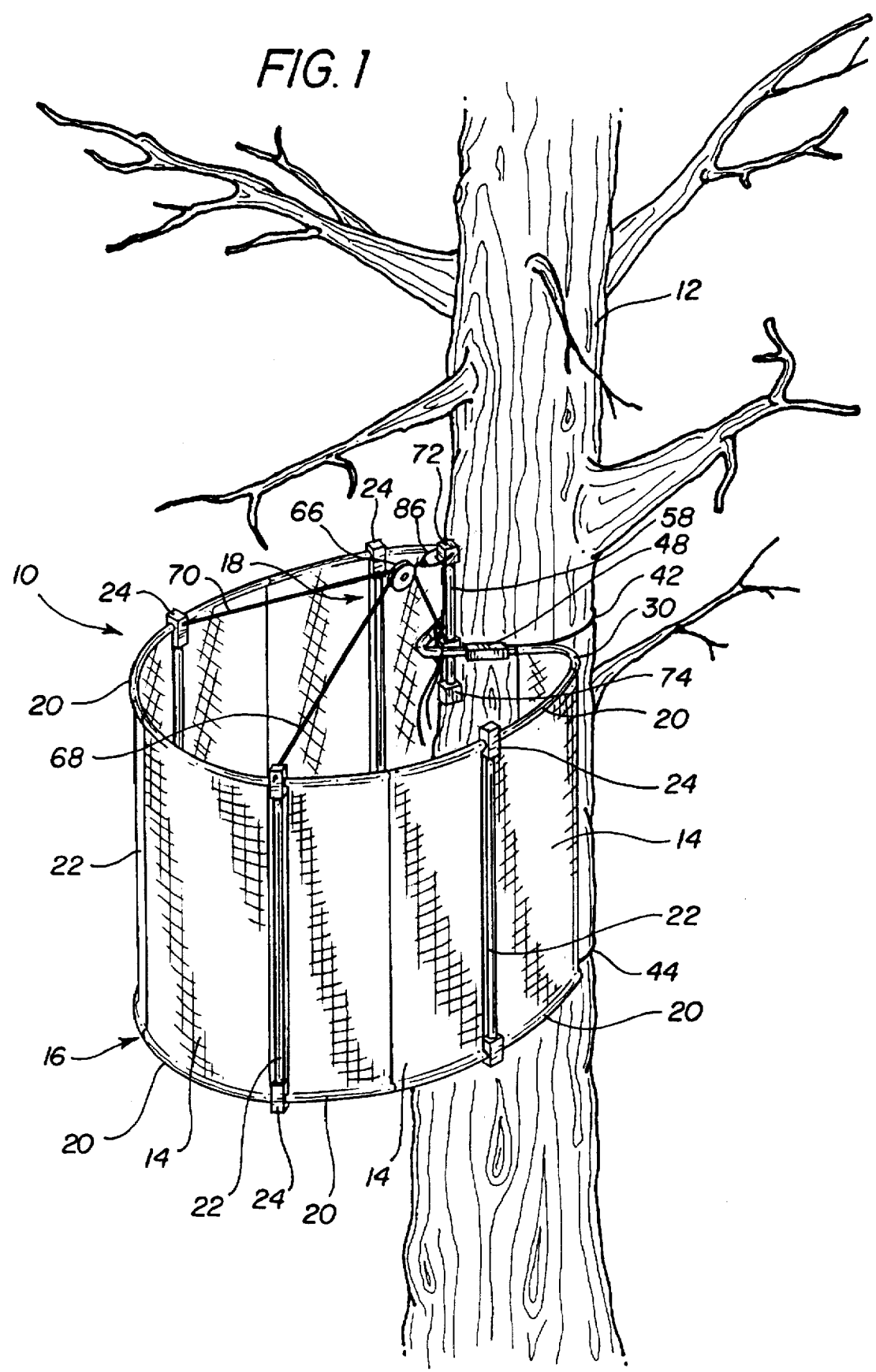
FIG. 1 is a perspective view of the present invention mounted in a tree.

Referring now to the drawing figures, wherein like reference numerals refer to like parts throughout, there is seen in FIG. 1 a hunting blind, denoted generally by reference numeral 10, mounted in a tree 12. Hunting blind 10 is seen to be comprised of a plurality of fabric sheets 14 held in place by a framework denoted generally 16. Also, a pulley system, denoted generally 18, is operatively attached to framework 16 for purposes of raising, lowering, and leveling hunting blind 10 with respect to tree 12.

Figure 2:
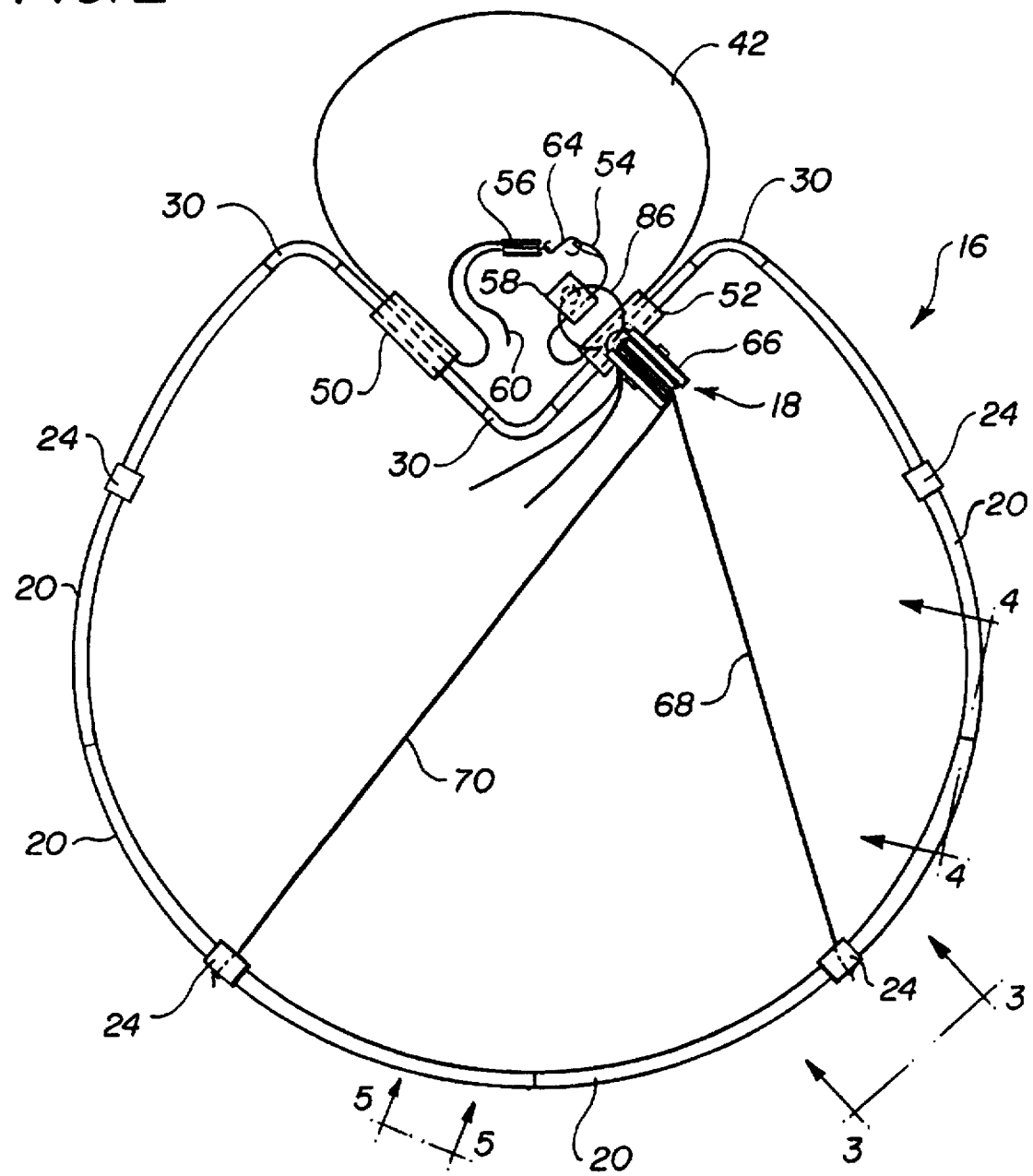
FIG. 2 is a top plan view of the invention.

Framework 16 is essentially comprised of a lattice of horizontal and vertical support members 20 and 22, respectively, interconnected to one another by mounting block tees 24. Horizontal and vertical support members are preferably manufactured from aluminum tube stock for its strong, lightweight properties. As seen in FIG. 3, tees 24 include one bored hole 26 formed therein for reception of vertical support rod 22, and a through hole 28 formed therethrough for reception of at least one horizontal support rod 20. Although substantially cylindrical when assembled, framework 16 includes at least three elbow members 30 interconnected at spaced intervals to horizontal support rods 20. Elbow members 30 permit framework 16 to be configured to contour a tree's trunk, as seen in FIGS. 1 and 2. Elbow members 30 are shown to be included along the upper set of horizontal support members 20, but they may also be included in the lower set.

Horizontal support members 20 are composed of shock corded, aluminum tubing, as illustrated in FIGS. 4 and 4A. Shock corded tubing includes independent segments of tubing 20' and 20", for instance, through which an elastic cord 32 passes. One end of the tubing segments is tapered inwardly, denoted by reference letter T, to permit the abutting end of the adjacent segment of tubing to cooperatively fit thereover. This construction permits the horizontal portion of the framework to be quickly set up or knocked down, as elastic cord 32 keeps all tubing segments connected to one another, and permits them to be stored in side by side relation to one another.

Before passing all of the horizontal support members 20 through tees 24, fabric sheets 14 may be slidably attached thereto. Fabric sheets 14 include looped upper and lower ends 34 and 36, respectively, formed by the ends of the fabric being folded back over and upon itself, and then stitched across its entire width. Upper and lower horizontal support members 20 may be slid through looped ends 34 and 36, respectively, before being inserted through mounting tees 24. About two fabric sheets 14 may be positioned on horizontal support members 20 between adjacent vertical support members 22. By positioning two fabric sheets 14 between adjacent vertical support members 22, and slidably attaching them to horizontal support members 20, a user may slide a fabric sheet 14 slightly to one side in order to get a weapon (i.e., gun barrel or arrow) or other object (i.e., binoculars) therethrough, or to get a clearer view of whatever is being hunted.

Figure 5:
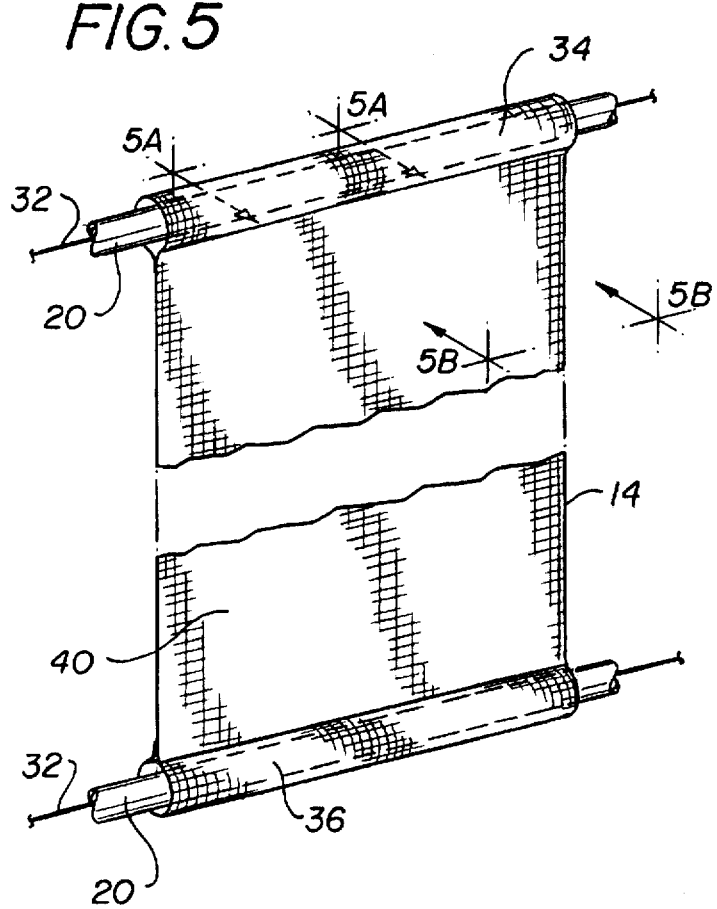
FIG. 5 is a perspective view of a fabric panel taken along view line 5—5 of FIG. 2.
Figure 5A:
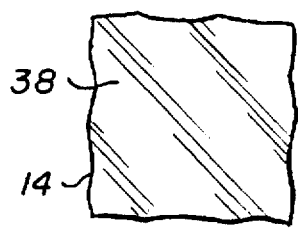
FIG. 5A is a partial elevational view of a fabric panel taken along view line 5A—5A of FIG. 5.
Figure 5B:
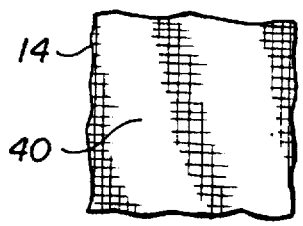
FIG. 5B is a partial elevational view of a fabric panel taken along view line 5B—5B of FIG. 5.
Figure 6:
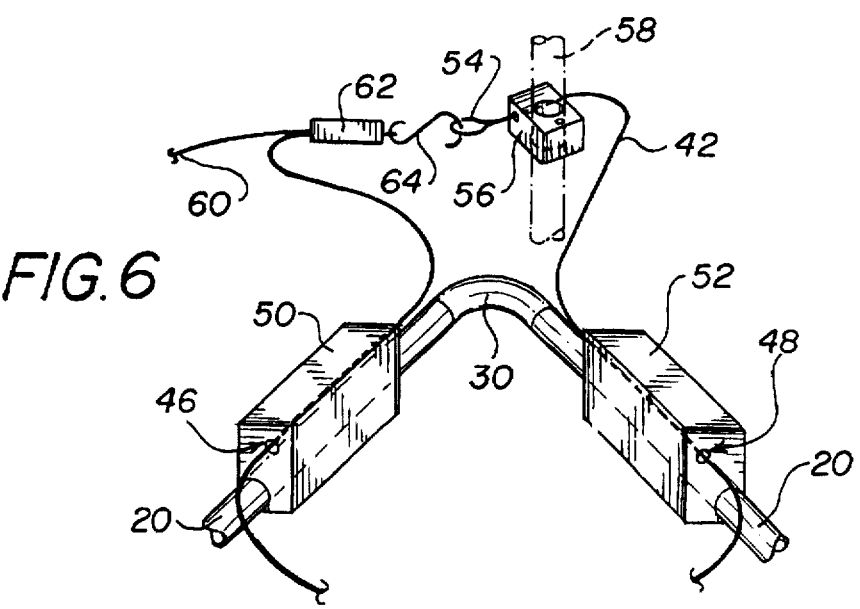
FIG. 6 is a perspective view of the ratchet assembly portion of the present invention.
Figure 7:
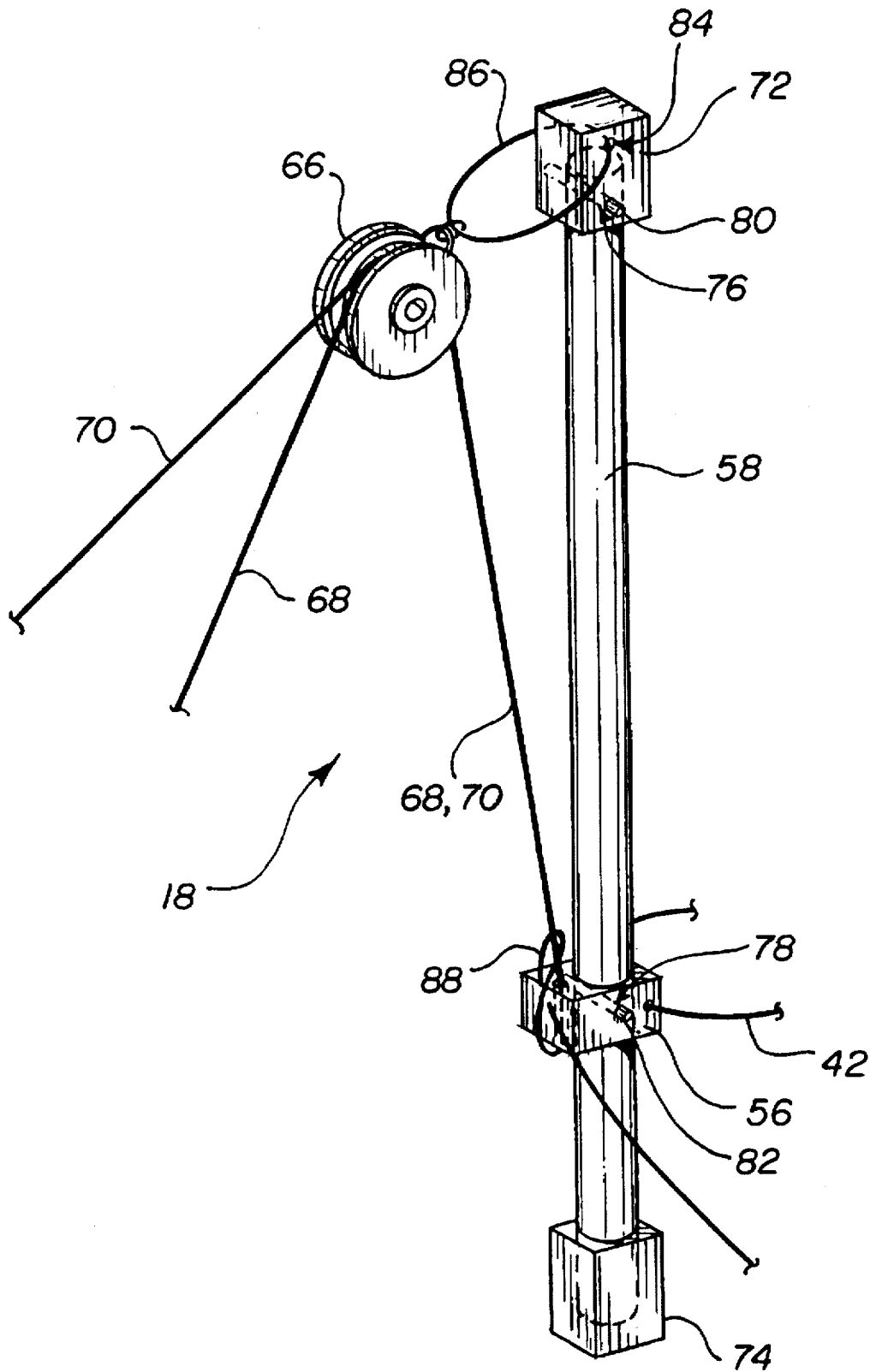
FIG. 7 is a perspective view of the pulley system of the present invention.

As seen in FIGS. 5A and 5B, fabric sheets 14 are manufactured from a material having particular physical characteristics. Light may pass through one side 38 of sheet 14 (FIG. 5A), but not the other side 40 (FIG. 5B). Sheets 14 should be mounted on horizontal support members such that side 38 is positioned on the interior of hunting blind 10, thereby permitting a user to see out, and preventing outside observers from seeing into blind 10. In addition, side 40 is camouflaged. Thus, the physical characteristics of hunting blind 10 prevent light from passing therethrough and help it blend into the environment, thereby ensuring that the presence of the person within blind 10 is obscured.

To mount blind 10 to tree 12, ropes 42 and 44 are wrapped around tree 12 at the top and bottom ends of blind 10, respectively. Bottom rope 44 may be tied off to a bottom, horizontal support member 20 in any conventional way, or may be tied off in the same manner as top rope 42, as will be explained hereinafter.

Rope 42 is passed through conduits 46 and 48 which are formed longitudinally through a pair of elongated mounting blocks 50 and 52, respectively, which are positioned on the horizontal support members 20 extending between elbows 30 and positioned in abutting relation to tree 12. After rope 42 passes through conduits 46 and 48, and is wrapped around tree 12, or other vertically oriented object, one of its free ends 54 passes through a mounting block 56 used to support a pulley support rod 58. Its other free end 60 passes through a one-way ratchet 62. An S-hook 64 interconnects, or bridges, rope end 54 and the portion of rope 42 that passed through ratchet 62. Rope 42 may securely mount blind 12 in tree 12 by pulling on free end 60 until rope 42 is tightly drawn around tree 12. It should be made clear that ropes 42 and 44 are only supporting the weight of blind 10, as the user would be positioned on a self supporting tree stand (not shown as it forms no part of the present invention). Therefore, ropes 42 and 44 will adequately support blind 10 in tree 12.

Once mounted in tree 12, blind 10 may be leveled or have its elevation adjusted a slight amount (less than 3 feet up or down), by utilizing pulley system 18. Pulley system 18 is generally comprised of a double sheath pulley 66, a pair of ropes 68 and 70 which pass over pulley 66, pulley support rod 58 with its upper mounting block 72, intermediate mounting block 56, and lower mounting block 74, keeping it vertically positioned adjacent tree 12, and with its uppermost portion being spaced vertically above framework 16. As previously discussed, rope 42 passes through intermediate mounting block 56, and around tree 12, thereby maintaining the vertical positioning of pulley support rod 58.

Upper and lower mounting blocks 72 and 74, respectively, include bored holes formed in one end thereof for securely receiving the top and bottom ends of support rod 58, respectively. In addition, upper and intermediate mounting blocks 72 and 56, respectively, include holes 76 and 78, respectively, formed therethrough which may be axially aligned with holes formed transversely through the top end and an intermediate position of support rod 58. It is important that holes 76 and 78 intersect the holes formed through support rod 58. When holes 76 and 78 are axially aligned with the transverse holes formed through support rod 58, cotter pins 80 and 82 may be passed therethrough (through both mounting blocks 72 and 56 and support rod 58) to securely maintain the positioning of blocks 56 and 72 with respect to support rod 58.

Upper support block 72 also includes another hole 84 formed therethrough for receiving an O-ring 86. Hole 84 extends parallel to hole 76, but not in intersecting relation to support rod 58. Pulley 66 is attached to O-ring 86. Therefore, pulley 66 is securely positioned adjacent the top end of support rod 58, and thus, in vertically spaced relation above framework 16.

Ropes 68 and 70 are tied off to separate mounting blocks 24 positioned on opposite sides of framework 16 from tree 12. Each rope 68 and 70 controls the adjustments made to the side of blind 10 to which it is attached. Preferably, the two mounting blocks to which ropes 68 and 70 are tied off are equidistant from pulley 66, thereby ensuring symmetry with pulley system 18. The opposite ends of ropes 68 and 70 pass over pulley 68 and then extend downwardly along support rod 58, and through a vertically oriented hole 88 formed through intermediate mounting block 56; hole 88 being parallel to the hole through which support rod 58 passes. Once passed through hole 88, ropes 68 and 70 may be tied in a knot to keep themselves taut, and hold and support the portion of blind 10 positioned opposite tree 12.

To level or vertically adjust blind 10, ropes 68 and 70 should be untied, and the appropriate rope pulled or released to correspondingly raise or lower the side of blind 10 to which the rope extends. By pulling or releasing both ropes 68 and 70 simultaneously, the entire blind will raise or lower a distance corresponding to the amount pulled or released.

This invention should not be limited to the extent of the details herein, but should extend to the full scope and spirit as defined by the following claims.

What is claimed is:

1. A portable hunting blind mountable in an elevated position, to a vertically oriented object, said blind comprising:
    a) a framework comprised of a lattice composed of a plurality of interconnected, elongated members, said framework defining a top, a bottom, and a continuous side of said blind;
    b) at least one fabric sheet removably secured to said framework for enclosing said framework's side;
    c) means for mounting said framework in said elevated position to said vertically oriented object; and
    d) pulley means for adjusting the elevation of said blind when said blind is mounted to said vertically oriented object.

2. The invention according to claim 1 wherein said framework includes first and second sets of tubular members adapted to be mounted in first and second horizontal planes, respectively, and adapted to be held in spaced vertical relation by a plurality of rods adapted to be operatively connected to and laterally spaced in vertically extending relation to said first and second series of tubular members.

3. The invention according to claim 2 wherein said first and second sets of tubular members are attached to said plurality of rods by mounting tees.

4. The invention according to claim 2 wherein said first and second sets of tubular members are composed of shock-cord tubing.

5. The invention according to claim 2 including a plurality of fabric sheets slidably mounted to and tautly extending between said first and second series of tubular members.

6. The invention according to claim 1 wherein said at least one fabric panel has first and second sides and is composed of a material having the physical characteristic of light being able to effectively pass through only one of said first and second sides thereof.

7. The invention according to claim 1 wherein said means for mounting said framework includes:
    a) a rope having first and second free ends, adapted to be wrapped circumferentially around said vertically oriented object;
    b) first and second mounting blocks attached to said framework, each including a rope receiving hole formed therethrough, said first and second mounting blocks adapted to be positioned in abutting relation to said vertically oriented object;
    c) means for securely retaining said first end of said rope; and
    d) a ratchet having a one way clutch mechanism incorporated therein, said ratchet adapted to receive said second end of said rope therein, whereby when said second end of said rope is pulled tightly through said ratchet, said rope securely supports said framework with respect to said vertically oriented object.

8. The invention according to claim 7 wherein said means for retaining said first end of said rope includes an S-hook which bridges said first end of said rope to said ratchet, thereby securely retaining said first end of said rope.

9. The invention according to claim 1 wherein said pulley means includes:
    a) first and second ropes having first and second free ends, respectively, said first ends of said first and second ropes being attached to first and second points on said framework, respectively;
    b) an elongated pulley support rod adapted to be remotely attached to said framework, adjacent to and in vertically extending relation to said vertically oriented object, said pulley support rod having upper and lower ends, said upper end adapted to be positioned in vertically spaced relation above said framework;
    c) a pulley operatively connected to said pulley support rod's upper end, and operatively receiving said first and second ropes thereover; and
    d) means for securely retaining said second ends of said rope in a position adjacent said vertically oriented object.

10. The invention according to claim 9 wherein said first and second points on said framework to which said first ends of said first and second ropes are attached, are on opposing sides of and are substantially equidistant from said pulley.

11. A pulley assembly for adjusting the elevation of a hunting blind comprised of a framework defining a top, a bottom, and a side of said blind, and mountable in an elevated position, to a vertically oriented object, said pulley assembly comprising:

a) first and second ropes having first and second free ends, respectively, said first ends of said first and second ropes being attachable to first and second points on said framework, respectively;

b) an elongated pulley support rod adapted to be remotely attached to said framework, adjacent to and in vertically extending relation to said vertically oriented object, said pulley support rod having upper and lower ends, said upper end adapted to be positioned in vertically spaced relation above said framework;

c) a pulley operatively connected to said pulley support rod's upper end, and operatively receiving said first and second ropes thereover; and d) means for securely retaining said second ends of said rope in a position adjacent said vertically extending object.

12. The invention according to claim 11 wherein said first and second points on said framework to which said first ends of said first and second ropes are attached, are on opposing sides of and are substantially equidistant from said pulley.

13. The invention according to claim 11 wherein said framework of said blind includes first and second sets of tubular members mountable in first and second horizontal planes, respectively, and held in spaced vertical relation by a plurality of rods operatively connected to and laterally spaced, in vertically extending relation, to said first and second series of tubular members.

14. The invention according to claim 13 including a plurality of fabric sheets slidably mounted to and tautly extending between said first and second series of tubular members.

15. The invention according to claim 14 wherein said fabric panels each include first and second sides, and are composed of a material having the physical characteristics of light being able to effectively pass through only one of said first and second sides thereof.

16. The invention according to claim 11 further comprising ratchet means for mounting said framework in said elevated position to said vertically oriented object.

17. The invention according to claim 16 wherein said ratchet means is comprised of:

a) a rope having first and second free ends, adapted to be wrapped circumferentially around said vertically oriented object;

b) first and second mounting blocks attached to said framework, each including a rope receiving hole formed therethrough, said first and second mounting blocks adapted to be positioned in abutting relation to said vertically oriented object;

c) means for securely retaining said first end of said rope; and d) a ratchet having a one way clutch mechanism incorporated therein, said ratchet adapted to receive said second end of said rope therein, whereby when said second end of said rope is pulled tightly through said ratchet, said rope securely supports said framework with respect to said vertically oriented object.

18. The invention according to claim 17 wherein said means for retaining said first end of said rope includes an S-hook which bridges said first end of said rope to said ratchet, thereby securely retaining said first end of said rope.

19. A ratchet assembly for securely mounting a hunting blind comprised of a framework defining a top, a bottom, and a side of said blind and adapted to be mounted in an elevated position, to a vertically oriented object, said ratchet assembly comprised of:

a) a rope having first and second free ends, adapted to be wrapped circumferentially around said vertically oriented object;

b) first and second mounting blocks attachable to said framework, each including a rope receiving hole formed therethrough, said first and second mounting blocks adapted to be positioned in abutting relation to said vertically oriented object;

c) means for securely retaining said first end of said rope; and d) a ratchet having a one way clutch mechanism incorporated therein, said ratchet adapted to receive said second end of said rope therein, whereby when said second end of said rope is pulled tightly through said ratchet, said rope securely supports said framework with respect to said vertically oriented object.

20. The invention according to claim 19 wherein said means for retaining said first end of said rope includes an S-hook which bridges said first end of said rope to said ratchet, thereby securely retaining said first end of said rope.

* * * * *